(12) United States Patent
Loacker

(10) Patent No.: US 11,691,491 B2
(45) Date of Patent: Jul. 4, 2023

(54) DRIVETRAIN

(71) Applicant: DESIGNWERK TECHNOLOGIES AG, Winterthur (CH)

(72) Inventor: Frank Loacker, Pfungen (CH)

(73) Assignee: DESIGNWERK TECHNOLOGIES AG, Winterthur (CH)

(*) Notice: Subject to any disclaimer, the term of this patent is extended or adjusted under 35 U.S.C. 154(b) by 613 days.

(21) Appl. No.: 16/545,960

(22) Filed: Aug. 20, 2019

(65) Prior Publication Data
US 2021/0054908 A1  Feb. 25, 2021

(51) Int. Cl.
| B60K 1/02 | (2006.01) |
| B60K 17/24 | (2006.01) |
| F16H 57/02 | (2012.01) |
| H02K 7/00 | (2006.01) |
| H02K 7/116 | (2006.01) |
| F16H 1/20 | (2006.01) |

(52) U.S. Cl.
CPC ............... *B60K 1/02* (2013.01); *B60K 17/24* (2013.01); *F16H 57/02* (2013.01); *H02K 7/006* (2013.01); *H02K 7/116* (2013.01); *B60Y 2200/14* (2013.01); *B60Y 2200/91* (2013.01); *F16H 1/206* (2013.01); *H02K 2213/03* (2013.01)

(58) Field of Classification Search
CPC ........... B60K 1/02; B60K 17/24; F16H 57/02; F16H 55/12; H02K 7/006; B60Y 2200/91
See application file for complete search history.

(56) References Cited

U.S. PATENT DOCUMENTS

| 2,038,509 | A | * | 4/1936 | Falk | ........................ F16H 55/12 74/432 |
| 4,233,858 | A | * | 11/1980 | Rowlett | ................... B60K 6/30 290/22 |
| 4,270,622 | A | * | 6/1981 | Travis | ................... B60L 3/0061 475/5 |
| 4,306,179 | A | * | 12/1981 | Whitford | ................ H02P 7/285 318/432 |

(Continued)

FOREIGN PATENT DOCUMENTS

| CN | 107284211 A | 10/2017 |
| CN | 207368041 U | 5/2018 |

(Continued)

OTHER PUBLICATIONS

Co-pending U.S. Appl. No. 16/543,100, Loacker et al., "Power Supply," filed Aug. 16, 2019.
(Continued)

*Primary Examiner* — Frank B Vanaman
(74) *Attorney, Agent, or Firm* — Pauley Erickson & Swanson

(57) ABSTRACT

A drive train for an electric truck includes a gearbox and a gear box housing. The drive train further includes an output shaft extending in an axial direction across a wall of the gear box housing and powering a cardan shaft arranged outside of the gear box housing. At least one output gear is arranged inside of the gear box housing on the output shaft. At least a first and a second electric motor attached to the housing of the gearbox form a team of electric motors, wherein each electric motor includes a drive shaft extending parallel to the axial direction and being interconnected via an input gear to an output gear.

12 Claims, 2 Drawing Sheets

(56) References Cited

U.S. PATENT DOCUMENTS

| | | | | |
|---|---|---|---|---|
| 4,370,603 A * | 1/1983 | Franz, Jr. | ............... | H02P 7/2985 |
| | | | | 318/252 |
| 4,685,354 A * | 8/1987 | McCabria | ................ | H02K 7/10 |
| | | | | 475/5 |
| 5,558,589 A | 9/1996 | Schmidt | | |
| 5,562,178 A * | 10/1996 | Worden | ................... | B60K 1/00 |
| | | | | 180/65.6 |
| 5,679,087 A * | 10/1997 | Lutz | ...................... | F16H 57/082 |
| | | | | 475/346 |
| 6,364,806 B1 * | 4/2002 | Spaniel | .................. | B60K 17/04 |
| | | | | 477/3 |
| 6,566,826 B2 * | 5/2003 | Imai | ..................... | B60W 20/10 |
| | | | | 903/910 |
| 8,596,165 B2 * | 12/2013 | Kovach | .................. | F16H 1/227 |
| | | | | 74/661 |
| 2010/0193295 A1 * | 8/2010 | Roddis | ...................... | F16N 7/32 |
| | | | | 184/6.26 |
| 2011/0017015 A1 * | 1/2011 | Cimatti | ............... | F16H 61/0028 |
| | | | | 903/909 |
| 2017/0343099 A1 * | 11/2017 | Greiter | .................. | F16H 57/045 |
| 2018/0076687 A1 * | 3/2018 | Pritchard | ............... | H02K 7/116 |
| 2018/0351434 A1 * | 12/2018 | Knoblauch | .............. | H02K 1/32 |

FOREIGN PATENT DOCUMENTS

| | | |
|---|---|---|
| CN | 109677253 A | 4/2019 |
| CN | 208812975 U | 5/2019 |
| CN | 208881608 U | 5/2019 |
| CN | 109955704 A | 7/2019 |
| DE | 10 2017 214 023 A1 | 2/2019 |
| DE | 10 2017 214 745 A1 | 2/2019 |
| EP | 1 031 452 A2 | 8/2000 |
| EP | 3 327 821 A1 | 5/2018 |

OTHER PUBLICATIONS

Co-pending U.S. Appl. No. 16/544,222, Loacker, "Battery Pack," filed Aug. 19, 2019.

Co-pending U.S. Appl. No. 16/586,399, Loacker, "Electric Truck," filed Sep. 27, 2019.

* cited by examiner

DRIVETRAIN

BACKGROUND OF THE INVENTION

Field of the Invention

The present invention relates to a drive train for an electric truck.

Discussion of Related Art

CN109677253A published on Apr. 26, 2019 in the name of Qingdao Qingte Zhongli Axle Co Ltd. discloses an electric drive axle of a commercial vehicle, and particularly relates to an integrated dual-motor mechanical differential electric drive axle, which has an integrated power assembly system.

CN107284211A published on Oct. 24, 2017 in the name of Suzhou Greencontrol Trans Technology Co Ltd. discloses a pure-electric driving assembly of a heavy truck. The assembly comprises a driving motor. An output shaft of the driving motor stretches into the interior of a flywheel housing. The output shaft is connected with an input shaft end of a flywheel. The outer ring surface of the flywheel is provided with a clutch pressure plate driven plate assembly. An output shaft of the clutch pressure plate driven plate assembly is connected with an input end of a gearbox. The gearbox is provided with an ATM gear-selection and gear-shifting mechanism. An output end of the gearbox is externally connected with an output flange used for connecting with a hub input structure or a wheel rotating input structure of the heavy truck.

SUMMARY OF THE INVENTION

It is an object of the invention to improve the state of the art in the field of drive trains for electric trucks.

A preferred variation the disclosure is directed to a drive train or power assembly for an electric truck. The drive train comprises a gearbox comprising a gear box housing. The housing of the gearbox may be of a multi part design. Preferably the gearbox housing has two part such as a front part and a rear part which are substantially identical. The front part and the rear part are usually interconnectable to each other in a separation plane. The separation plane may be planar and/or staggered, however other designs are also possible depending on the application. The gearbox housing is usually made from metal.

The drive train further comprises an output shaft extending in an axial direction across a wall of the gear box housing. The output shaft is designed to power a cardan shaft arranged outside of the gear box housing. The cardan shaft may be interconnected to the output shaft. The gearbox preferably comprises at least one output shaft bearing for bearing the output shaft. At least one output shaft bearing is usually arranged at the wall across which the output shaft extends. Furthermore, the drive train comprises at least one output gear arranged inside of the gear box housing on the output shaft. The output gear is preferably a double helical ring gear. The output gear rotates during operation around a rotational axis which is parallel to the axial direction and goes through the center point of the output gear. The separation plane of the multi-part gearbox housing is preferably perpendicular to the rotational axis. The output gear may be of a multi-part design. The output gear may comprise a disc-shaped gear body and at least one ring gear detachably interconnected to the gear body. Preferably multiple ring gears are present. A first and a second gear ring may be arranged back to back to each other on the gear body. This reduces the force transmitted on each of the ring gears. The gear body and the output shaft may be integrally formed. If appropriate at least one ring gear is formed as helical ring gear. Preferably the output gear comprises a first and a second helical ring gear. Good results are possible if a first and a second helical gear ring are arranged back to back to each other on the gear body forming a double helical ring gear. A double helical ring gear is advantageous during operation for noise reduction and avoidance of axial forces, especially in the case of very strong load changes.

Depending on the application the gearbox may further comprise a center differential preferably arranged coaxially to the output gear. A center differential provides the advantage that the power can be distributed into two directions allowing a four-wheel drive operation of the electric truck.

In a preferred variation at least a first and a second electric motor are attached to the housing of the gearbox forming a team of electric motors. The team of electric motors may comprise two or more electric motors, preferably an even number of motors. The electric motors each have a drive shaft. At least one drive shaft may extend parallel to the axial direction. Preferably the drive shaft of each electric motor extends parallel to the axial direction. The drive shaft of each electric motor being interconnected via an input gear to an output gear. The ratio between the input gear and the output gear is usually between 3:1 and 15:1.

At least one nozzle bridge may extend between the front part and the rear part of the gearbox housing and may comprise at least one nozzle for injecting oil into the gear box. The nozzle bridge is preferably C-shaped and partially surrounds at least one input gear. The nozzle may be arranged partially inside the nozzle bridge. Preferably the nozzle comprises a nozzle tip pointing towards the input gear. An oil sump may supply oil to the nozzle bridge via an oil pump interconnecting the oil sump and the nozzle bridge. The oil pump may be operatively connected to the output shaft. The output shaft preferably drives at least one pump. If appropriate the output shaft drives multiple pumps such as the oil pump and a pump for the steering hydraulics. Preferably these pumps are arranged at the gearbox housing opposite of the cardan shaft.

The front part and/or the rear part of the multi part gearbox housing may comprise at least one mounting flange suitable to attach an electric motor. Furthermore, the gearbox housing may act as a carrying structure configured to support the respective electric motors via mounting flanges.

Good results can be achieved when the input gears of the electric motors are directly coupled to an output gear forming a single stage gearbox. A single stage gearbox has the advantages of being smaller in size, lighter in weight and more efficient than to a multi stage gearbox. The dimensions of the housing in the axial direction is preferably less than in the lateral direction or the vertical direction. The axial, the lateral and the vertical direction being pair-wise perpendicular to each other. Further advantages of a single stage gearbox are little service effort, low life cycle costs, and a long product service life.

The same or different types of electric motors may be used in the same team of electric motors. In a variation at least one electric motors of the team of electric motors is of a synchronous type and at least one electric motors of the team of electric motors is of an asynchronous type. Preferably the control of the team of electric motors is configured in such a way that the more efficient electric motor can take over in the corresponding load range. This allows an increase in efficiency compared to the use of a single type of electric motors in the team of electric motors. Preferably light, fast rotating electric motors are used. This allows the weight to be reduced, while providing a high torque and powerful drive for the electric truck.

Preferably at least one electric motors of the team of electric motors is torque controlled. This is preferable for all electric motors of a team. If appropriate two or more electric motors of the team of electric motors are operated with the same torque. This ensures a uniform power transmission from the motors to the output gear without an undesired imbalance in transmitted forces on the output gear.

Depending on the size of the electric truck and power requirement a variable number of electric motors can be arranged at the gearbox housing. Multiple electric motors allow a continuation of the driving operation in the event of failure of a motor or associated electronics which control the respective electric motor. Preferably the number of electric motors is even, however an odd number of electric motors is also possible. Usually the electric motors are arranged concentrically around the output shaft and along the at least one ring gear. Depending on the application at least a first and a second electric motor may be arranged on opposite sides of the housing of the gear box forming a pair of electric motors. Preferably the first and the second electric motor are arranged coaxial with respect to their drive shafts. In this configuration drive shafts of the pair of electric motors may be directly interconnected forming a single drive shaft extending between the two motors. Alternatively, or in addition at least a first and a second electric motor may be arranged on the same side of the housing of the gear box.

Good results can be obtained when the team of electric motors comprises four electric motors arranged in two pairs of electric motors. At least one pair of electrical motors is preferably arranged mirror symmetrically with respect to a plane perpendicular to the axial direction and/or a plane perpendicular the lateral direction. Both mirror planes go through the center point of the gear box housing.

The front part and/or the rear part of the gearbox housing may comprise a wall extending essentially perpendicular to the axial direction with cooling means interconnected to said wall. This wall separates the inside of the gearbox from the outside. The cooling means may be arranged on the outside of said wall. Preferably the cooling means may be formed as a cooling plate, however depending on the circumstances other types of cooling means such as a ventilators and/or cooling fins are possible. In addition, cooling ribs can be arranged on the inner side of said wall facing the output gear in order to increase the surface area of the wall for thermal exchange. The cooling plate preferably comprises a channel connected to an external cooling circuit for a cooling fluid to flow through. The cooling ribs preferably protrude from the wall in the axial direction towards the output gear.

The disclosure may be summarized by the following clauses:

Clause 1: A drive train for an electric truck, said drive train comprising
  a. a gearbox comprising a gear box housing;
  b. an output shaft extending in an axial direction across a wall of the gear box housing and powering a cardan shaft arranged outside of the gear box housing;
  c. at least one output gear arranged inside of the gear box housing on the output shaft;
  d. at least a first and a second electric motor attached to the housing of the gearbox forming a team of electric motors, wherein
  e. each electric motor is having a drive shaft extending parallel to the axial direction and being interconnected via an input gear to an output gear.

Clause 2: The drive train according to clause 1, wherein the electric motors of the team of electric motors are torque controlled.

Clause 3: The drive train according to clause 1 or 2, wherein a first and a second electric motor are arranged on the same side of the housing of the gear box forming a pair of electric motors.

Clause 4: The drive train according to clause 1 or 2, wherein a first and a second electric motor are arranged on opposite sides of the housing of the gear box forming a pair of electric motors.

Clause 5: The drive train according to clause 4, wherein the first and the second electric motor are arranged coaxial with respect to their drive shafts.

Clause 6: The drive train according to any of the previous clauses, wherein the team of electric motors comprises four electric motors arranged in two pairs of electric motors.

Clause 7: The drive train according to at least one of clauses 3 to 6, wherein at least one pair of electrical motors is arranged mirror symmetrically with respect to a plane perpendicular to the axial direction and/or a plane perpendicular the lateral direction.

Clause 8: The drive train according to any of the previous clauses, wherein all electric motors of a team are operated with the same torque.

Clause 9: The drive train according to any of the previous clauses, wherein the input gears of the electric motors are directly coupled to an output gear forming a single stage gearbox.

Clause 10: The drive train according to any of the previous clauses, wherein the at least one output gear comprises a disc-shaped gear body and at least one ring gear detachably interconnected to the gear body.

Clause 11: The drive train according to clause 10, wherein a first and a second gear ring are arranged back to back to each other.

Clause 12: The drive train according to clause 10 or 11, wherein the gear body and the output shaft are integrally formed.

Clause 13: The drive train according to any of the previous clauses, wherein the ratio between the input gear and the output gear is in the range of 10.

Clause 14: The drive train according to any of the previous clauses, wherein the housing of the gearbox has a front part and a rear part which are substantially identical and interconnectable to each other in a separation plane arranged essentially perpendicular to the axial direction.

Clause 15: The drive train according to clause 14, wherein the front part and/or the rear part comprise at least one mounting flange suitable to attach an electric motor.

Clause 16: The drive train according to clause 14 or 15, wherein the wall of the gear box housing of the front part and/or the rear part is extending essentially perpendicular to the axial direction and cooling means interconnected to said wall.

Clause 17: The drive train according to clause any of the previous clauses, wherein the dimensions of the housing in the axial direction is less than in the lateral direction or the vertical direction.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims.

The drawings are showing.

DESCRIPTION OF PREFERRED EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
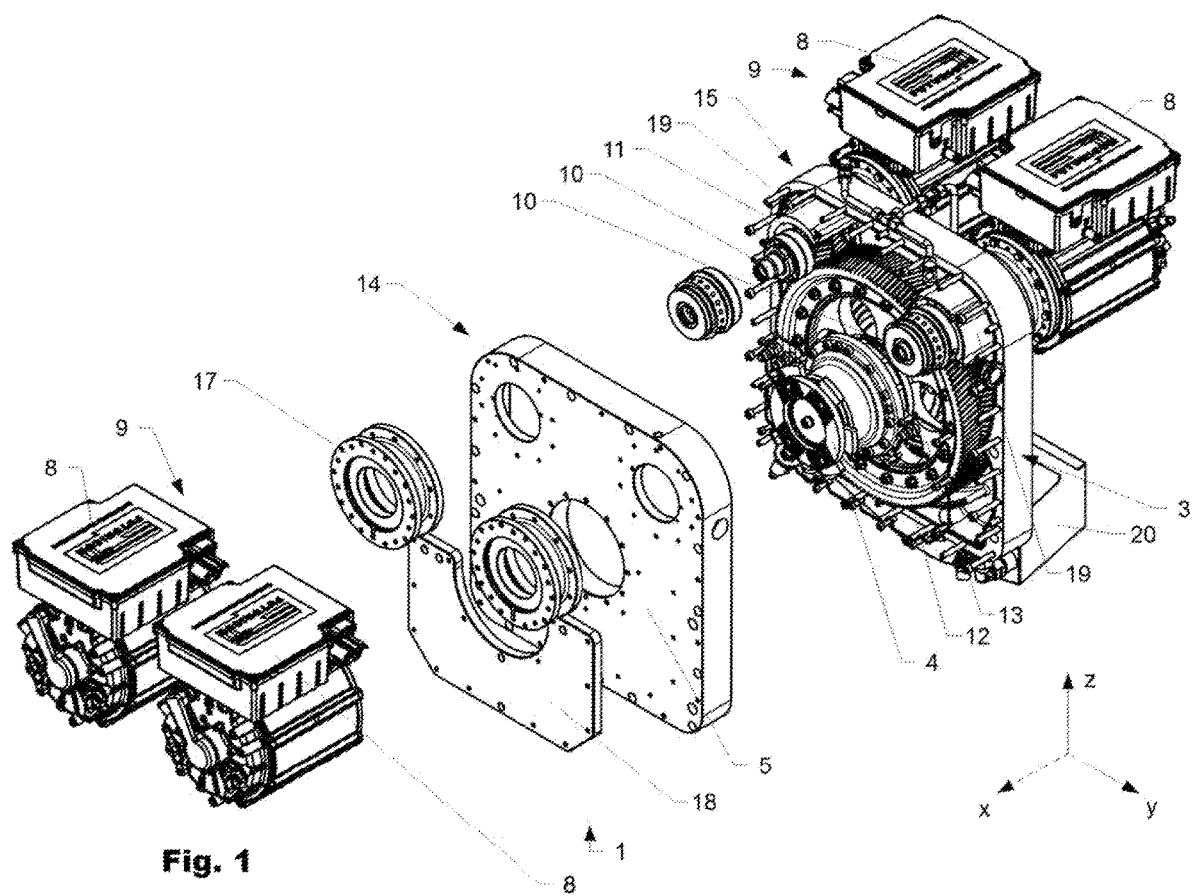
FIG. 1 an exploded view of a drive train according to the disclosure.

FIG. 1 shows a variation the disclosure is directed to a drive train 1 for an electric truck. The drive train 1 comprises a gearbox 2 and an electric motor 8, other numbers are possible such as four electric motors 8. The gearbox 2 comprises a housing 3 which has a front part 14 and a rear part 15 which are substantially identical. The front part 14 and the rear 15 part are interconnectable to each other in a separation plane 16 arranged essentially perpendicular to an axial direction (x) as visible in FIG. 4. The gearbox housing 3 is made from metal.

Figure 3:
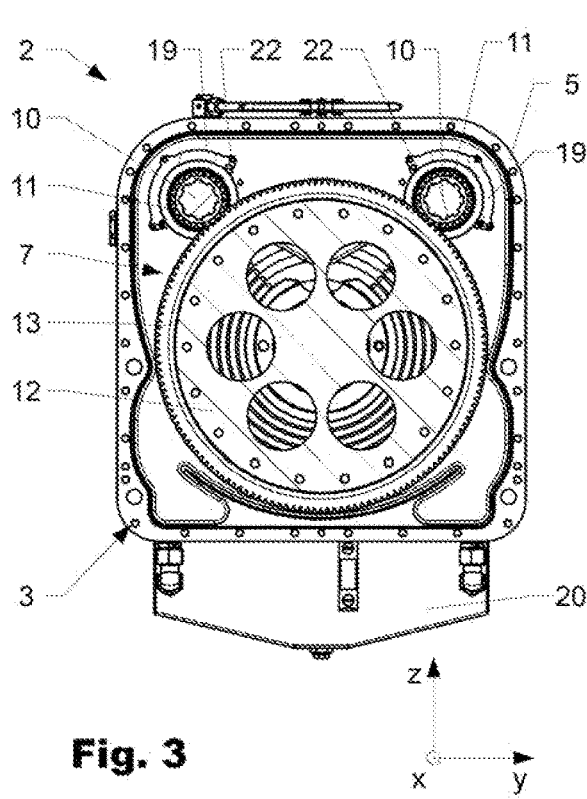
FIG. 3 a cross-sectional view of the drive train of FIG. 2 indicated by line A in FIG. 2.
Figure 4:
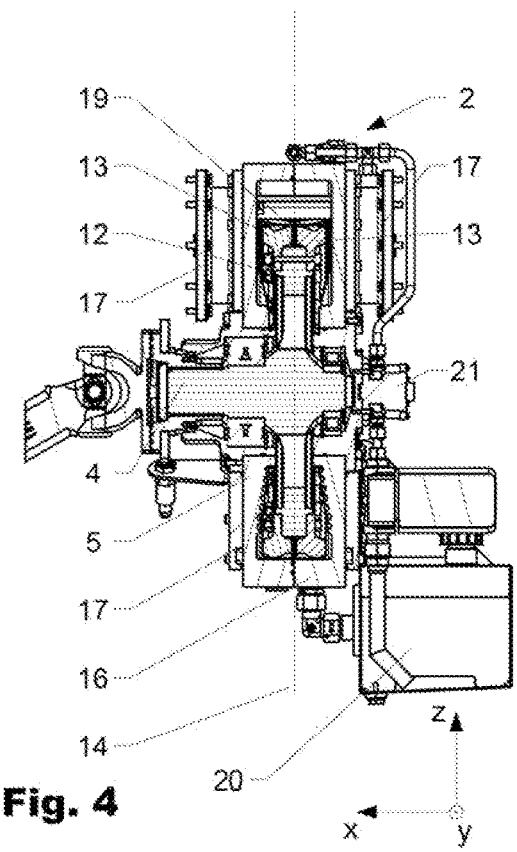
FIG. 4 a cross-sectional view of the drive train of FIG. 2 indicated by line B in FIG. 2.

FIG. 4 shows an output shaft 4 of the drive train 1 extending in the axial direction (x) across a wall 5 of the gear box housing and powering a cardan shaft (6) arranged outside of the gear box housing 3. FIGS. 1, 3 and 4 show an output gear 7 of the drive train 1 arranged inside of the gear box housing 3 on the output shaft 4. The output gear 7 comprises a disc-shaped gear body 12 and at least one ring gear 13 detachably interconnected to the gear body 12. In the shown variation a first ring gear 13 and a second ring gear 13 are arranged back to back to each other on the gear body 12. The gear body 12 and the output shaft 4 are integrally formed as shown in FIG. 4.

Figure 2:
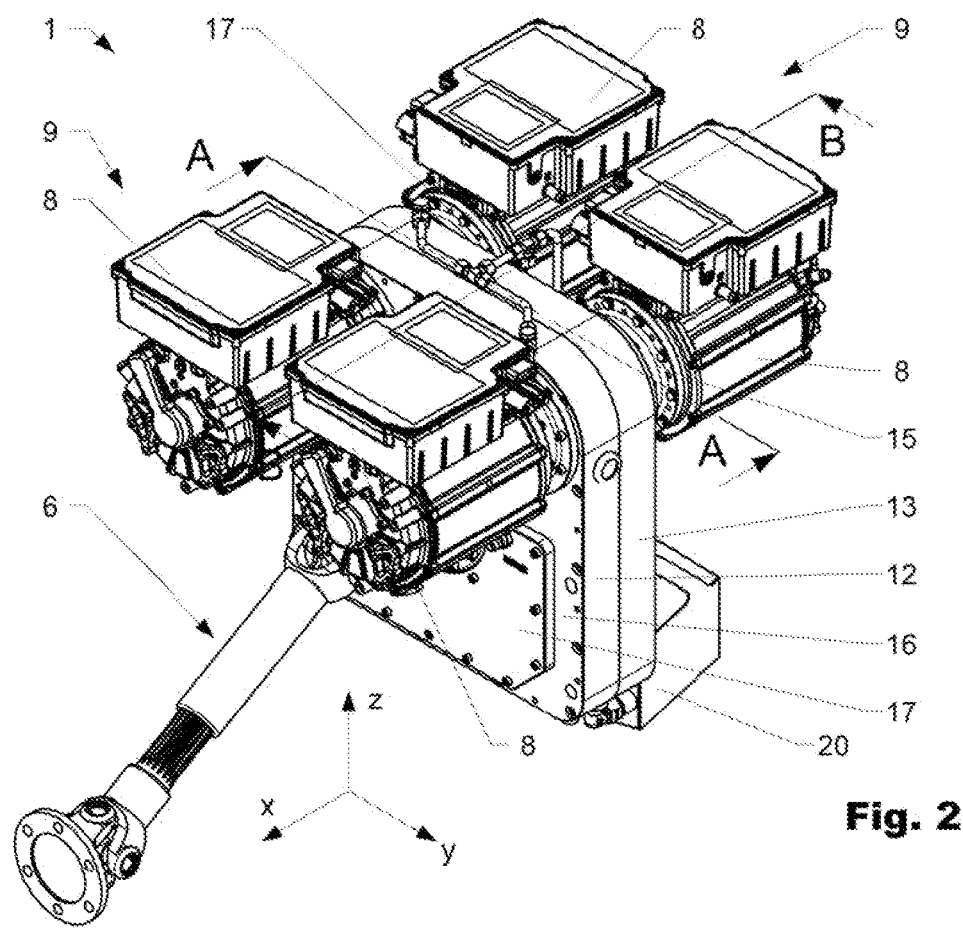
FIG. 2 the assembled drive train of FIG. 1 in a perspective view.

FIG. 2 shows the assembled drive train 1 having four electric motors 8 attached to the housing 3 of the gearbox 2 forming a team of electric motors 9. The electric motors 8 each have a drive shaft 10 extending parallel to the axial direction (x). The drive shaft 10 of each electric motor 9 being interconnected via an input gear 11 to an output gear 7. The ratio between the input gear 11 and the output gear 7 is in the range of 10:1.

Two nozzle bridges 19 are visible in FIGS. 1 and 3 extending between the front part 14 and the rear part 15 of the gearbox housing 3 and each comprising at least one nozzle 22. The nozzle bridges 19 are C-shaped and partially surround the respective input gear 11. An oil sump 20 as shown in FIG. 4 supplies oil to the nozzle bridge 19 via an oil pump 21. The oil pump 21 being interconnected to the oil sump 20 and to the nozzle bridge 19 in order to transport oil from the oil sump 21 to the at least one nozzle 22 of each nozzle bridge 19.

The front part 14 and the rear part 15 each comprise two mounting flanges 17, shown in FIG. 2. The gearbox housing 3 carries the electric motors 8 via the respective mounting flanges 17. The electric motors 8 of the power train 1 shown in FIG. 1 are directly coupled to the output gear 7 and form a single stage gearbox. The dimensions of the housing 3 in the axial direction (x) is less than in the lateral direction (y) or the vertical direction (z).

A first and a second electric motor 8 are arranged on opposite sides of the housing 3 of the gear box 2 forming a pair of electric motors. With respect to their drive shafts the first and the second electric motor are arranged coaxially. FIG. 2 shows in addition, a first and a second electric motor 8 arranged on the same side of the housing 3 of the gear box 2. In FIG. 2 two pairs of electric motors 8 are arranged coaxially on opposing sides of the gearbox housing 3. The two pairs are mirror symmetrically arranged in relation to a mirror plane parallel to the lateral and vertical direction (y, z), which is identical to the separation plane 17 as shown in FIG. 4.

During operation the electric motors 8 of the team of electric motors 9 are torque controlled operated and each electric motor 8 exerts the same torque on the output gear 7.

The front part 14 and/or the rear part 15 comprise a wall 5 extending essentially parallel to the separation plane 17. FIGS. 1 and 2 further show cooling means 18 arranged on said walls 5. The cooling means 18 are arranged on the outside of the walls 5 and comprise a cooling plate. The cooling plate comprises a channel connected to an external cooling circuit for a cooling fluid to flow through (not shown).

Rather, the words used in the specification are words of description rather than limitation, and it is understood that various changes may be made without departing from the scope of the invention.

LIST OF DESIGNATIONS

1 Drive train
2 Gearbox
3 Housing (gearbox)
4 Output shaft
5 Wall (gear box housing)
6 Cardan shaft
7 Output gear
8 Electric motor
9 Team of electric motors
10 Drive shaft (electric motor)
11 Input gear
12 Gear body
13 Ring gear
14 Front part (housing)
15 Rear part (housing)
16 Separation plane (housing)
17 Mounting flange
18 Cooling means (housing)
19 Nozzle bridge 20 Oil sump
21 Oil pump

What is claimed:

1. A drive train (1) for an electric truck, said drive train (1) comprising:
   a. a gearbox (2) comprising a gear box housing (3);
   b. an output shaft (4) extending in an axial direction (x) across a wall (5) of the gear box housing (3) and powering a cardan shaft (6) arranged outside of the gear box housing (3);
   c. at least one output gear (7) arranged inside of the gear box housing (3) on the output shaft (4);
   d. at least a first and a second electric motor (8) attached to the housing (3) of the gearbox (2) forming a team of electric motors (9), wherein
   e. each electric motor (8) includes a drive shaft (10) extending parallel to the axial direction (x) and being mechanically interconnected via an input gear (11) to the at least one output gear (7) in a continuous manner, wherein
   f. the input gears (11) of the electric motors (8) are directly coupled to the at least one output gear (7) forming a single stage gearbox (2);
   g. wherein the output gear (7) is integrally formed with the output shaft (4) and comprises a disc-shaped gear body (12) and a first and a second helical gear ring (13) arranged back to back to each other on the gear body (12) forming a double helical ring gear; and
   h. wherein the housing (3) of the gearbox (2) has a front part (14) and a rear part (15) which are substantially identical and interconnectable to each other in a separation plane (16) arranged essentially perpendicular to the axial direction (x).

2. The drive train according to claim 1, wherein the first and the second electric motor (8) are arranged on a same side of the housing (3) of the gear box (2) forming a pair of electric motors (8).

3. The drive train according to claim 2, wherein at least one pair of electrical motors (8) is arranged mirror symmetrically with respect to a plane perpendicular to the axial direction (x) and/or a plane perpendicular the lateral direction (y).

4. The drive train according to claim 1, wherein the first and the second electric motor (8) are arranged on opposite sides of the housing (3) of the gear box (2) forming a pair of electric motors (8).

5. The drive train according to claim 4, wherein the first and the second electric motor (8) are arranged coaxial with respect to their drive shafts (10).

6. The drive train according to claim 1, wherein the team of electric motors (9) comprises four electric motors (8) arranged in two pairs of electric motors (8).

7. The drive train according to claim 1, wherein all electric motors (8) of a team (9) are operated with the same torque.

8. The drive train according to claim 1, wherein the ratio between the input gear (11) and the output gear (7) is approximately 10:1.

9. The drive train according to claim 1, wherein the front part (14) and/or the rear part (15) comprise at least one mounting flange (17) configured to attach an electric motor (8).

10. The drive train according to claim 1, wherein the wall (5) of the gear box housing (3) of the front part (14) and/or the rear part (15) is extending essentially perpendicular to the axial direction and cooling means (18) interconnected to said wall (5).

11. The drive train according to claim 1, wherein the housing (3) includes a length in an axial direction (x) that is less than a length in a lateral direction (y) or a length in a vertical direction (z).

12. A drive train (1) for an electric truck, said drive train (1) comprising:
   a. a gearbox (2) comprising a gear box housing (3);
   b. an output shaft (4) extending in an axial direction (x) across a wall (5) of the gear box housing (3) and powering a cardan shaft (6) arranged outside of the gear box housing (3);
   c. at least one output gear (7) arranged inside of the gear box housing (3) on the output shaft (4);
   d. at least a first and a second electric motor (8) attached to the housing (3) of the gearbox (2) forming a team of electric motors (9);
   e. wherein each electric motor (8) includes a drive shaft (10) extending parallel to the axial direction (x) and being mechanically interconnected via an input gear (11) to the at least one output gear (7) in a continuous manner;
   f. wherein the input gears (11) of the electric motors (8) are directly coupled to the at least one output gear (7) forming a single stage gearbox (2); and
   g. wherein the housing (3) of the gearbox (2) has a front part (14) and a rear part (15) and at least one nozzle bridge (19) extends between the front part (14) and the rear part (15) of the gearbox housing (3), said nozzle bridge (19) comprises at least one nozzle (22) for injecting oil into the gear box (2).

* * * * *